(12) United States Patent
Mathews et al.

(10) Patent No.: US 11,320,603 B2
(45) Date of Patent: May 3, 2022

(54) OPTICAL COUPLING DEVICE WITH WAVEGUIDE ASSISTED REGISTRATION

(71) Applicant: 3M INNOVATIVE PROPERTIES COMPANY, St. Paul, MN (US)

(72) Inventors: Alexander R. Mathews, Austin, TX (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 36 days.

(21) Appl. No.: 16/946,817

(22) Filed: Jul. 8, 2020

(65) Prior Publication Data
US 2020/0341211 A1    Oct. 29, 2020

Related U.S. Application Data

(63) Continuation of application No. 15/763,492, filed as application No. PCT/US2016/056328 on Oct. 11, 2016, now Pat. No. 10,754,105.
(Continued)

(51) Int. Cl.
*G02B 6/38* (2006.01)
*G02B 6/42* (2006.01)
*G02B 6/36* (2006.01)

(52) U.S. Cl.
CPC ......... *G02B 6/3882* (2013.01); *G02B 6/3853* (2013.01); *G02B 6/3865* (2013.01);
(Continued)

(58) Field of Classification Search
CPC .. G02B 6/3865; G02B 6/3869; G02B 6/3882; G02B 6/3885
See application file for complete search history.

(56) References Cited

U.S. PATENT DOCUMENTS

| 5,037,179 A | 8/1991 | Bruno |
| 6,045,270 A | 4/2000 | Weiss |

(Continued)

FOREIGN PATENT DOCUMENTS

| EP | 0490698 | 6/1992 |
| JP | 04-324406 | 11/1992 |

(Continued)

OTHER PUBLICATIONS

International Search Report for PCT International Application No. PCT/US2016/056328, dated Dec. 12, 2016, 5 pages.

*Primary Examiner* — Daniel Petkovsek
(74) *Attorney, Agent, or Firm* — Michael J. Stern (57) ABSTRACT

A multi-piece optical coupling device comprises a first piece that includes one or more first receiving elements configured to receive and secure one or more optical waveguides. The first piece further includes one or more light affecting elements configured to affect one or more characteristics of light from the optical waveguides while propagating the light within the optical coupling device. A second piece is separate from the first piece and includes one or more second receiving elements configured to receive the waveguides, the first receiving elements and the second receiving elements configured to align the second piece and the first piece using the optical waveguides. The second piece also includes one or more mating alignment features configured to engage with a mating optical coupling device and to align the optical coupling device with the mating optical coupling device.

10 Claims, 11 Drawing Sheets

Related U.S. Application Data (60) Provisional application No. 62/240,010, filed on Oct. 12, 2015.

(52) U.S. Cl.
CPC ......... *G02B 6/3869* (2013.01); *G02B 6/3885* (2013.01); *G02B 6/3652* (2013.01); *G02B 6/383* (2013.01); *G02B 6/387* (2013.01); *G02B 6/3854* (2013.01); *G02B 6/3861* (2013.01); *G02B 6/4214* (2013.01)

(56) References Cited

U.S. PATENT DOCUMENTS

| | | |
|---|---|---|
| 6,298,192 B1 | 10/2001 | Yoo |
| 6,404,955 B1 | 6/2002 | Kikuchi |
| 6,628,865 B2 | 9/2003 | Crafts |
| 8,672,560 B2 * | 3/2014 | Haley .................. G02B 6/3885 385/78 |
| 8,757,893 B1 * | 6/2014 | Isenhour .............. G02B 6/3886 385/76 |
| 8,801,297 B2 * | 8/2014 | McColloch .......... G02B 6/4246 385/59 |
| 8,974,126 B2 | 3/2015 | Sloey |
| 9,417,404 B1 | 8/2016 | Barwicz |
| 9,709,750 B1 | 7/2017 | Wen-Lung |
| 10,754,105 B2 * | 8/2020 | Mathews ............. G02B 6/3865 |
| 2002/0003932 A1 | 1/2002 | Schofield |
| 2002/0076162 A1 * | 6/2002 | Crafts .................... G02B 6/30 385/49 |
| 2002/0114582 A1 | 8/2002 | Otera |
| 2003/0174998 A1 | 9/2003 | Shevchuk |
| 2011/0064357 A1 | 3/2011 | Chang |
| 2013/0121645 A1 | 5/2013 | Haley |
| 2013/0216189 A1 | 8/2013 | Grinderslev |
| 2013/0266271 A1 | 10/2013 | Li |
| 2014/0010499 A1 | 1/2014 | Suematsu |
| 2015/0050019 A1 | 2/2015 | Sengupta |
| 2015/0093922 A1 | 4/2015 | Bosscher |
| 2015/0117822 A1 | 4/2015 | Hu |
| 2015/0195942 A1 | 7/2015 | Rossman |
| 2016/0202430 A1 | 7/2016 | De Jong et al. |

FOREIGN PATENT DOCUMENTS

| | | |
|---|---|---|
| WO | WO 2013/048730 | 4/2013 |
| WO | WO 2014-168186 | 10/2014 |
| WO | WO 2015-038941 | 3/2015 |
| WO | WO 2016-115002 | 7/2016 |
| WO | WO 2017-065999 | 4/2017 |
| WO | WO 2017-066018 | 4/2017 |
| WO | WO 2017-066019 | 4/2017 |
| WO | WO 2017-066022 | 4/2017 |
| WO | WO 2017-066024 | 4/2017 |
| WO | WO 2017-066037 | 4/2017 |
| WO | WO 2017-066135 | 4/2017 |
| WO | WO 2017-066137 | 4/2017 |
| WO | WO 2017-066139 | 4/2017 |

* cited by examiner

OPTICAL COUPLING DEVICE WITH WAVEGUIDE ASSISTED REGISTRATION

TECHNICAL FIELD

This disclosure relates generally to optical coupling devices such as optical ferrules and optical connectors.

BACKGROUND

Optical coupling devices such as optical connectors and optical ferrules allow light from a one or more waveguides to pass through a first connector to a corresponding set of waveguides of a mating second connector. The mating devices mechanically couple together and align optical elements of the first device with optical elements of the mating device. Optical coupling devices can be used for optical communications in a variety of applications including telecommunications networks, local area networks, data center links, and internal links in computer devices.

BRIEF SUMMARY

Embodiments described herein are directed to multi-piece optical coupling device. According to some embodiments, a first piece includes one or more first receiving elements configured to receive and secure one or more optical waveguides. The first piece further includes one or more light affecting elements configured to affect one or more characteristics of light from the optical waveguides while propagating the light within the optical coupling device. A second piece is separate from the first piece and includes one or more second receiving elements configured to receive the waveguides, the first receiving elements and the second receiving elements configured to align the second piece and the first piece using the optical waveguides. The second piece also includes one or more mating alignment features configured to engage with a mating optical coupling device and to align the optical coupling device with the mating optical coupling device.

According to some embodiments, a first piece includes one or more first receiving elements configured for receiving and securing one or more optical waveguides. The first piece also includes one or more first mating alignment features configured to align the optical coupling device with a mating optical coupling device. A second piece, separate from the first piece, includes one or more second receiving elements configured for receiving the waveguides, the first receiving elements and the second receiving elements configured to align the second piece and the first piece using the optical waveguides. The second piece also includes one or more second mating alignment features configured to engage with a mating optical coupling device and to align the optical coupling device with a mating optical coupling device. The mating features may additionally provide a retention function to hold the optical coupling device with a mating optical coupling device together after mating.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments disclosed herein relate to waveguide-assisted registration of multi-piece optical coupling devices. An optical coupling device, such as an optical connector or optical ferrule, also referred to herein as a light coupling unit, can include one or more elements for receiving and securing one or more optical waveguides and one or more mating alignment features for aligning the optical coupling device with a mating optical coupling device. Some optical coupling devices provide for direct waveguide-to-waveguide optical coupling. Other optical coupling devices may include one or more optical elements disposed in the optical path between a waveguide and a mating waveguide, the optical elements affecting one or more characteristics of light from the optical waveguides as the light propagates through the optical coupling device. For example, the optical elements may comprise mirrors and/or lenses that affect one or more of the direction and the divergence of light from the waveguides.

Good quality coupling of optical signals through an optical interface requires relative positioning of all optical components along the signal path. Mechanical mating alignment features of an optical coupling device align the optical coupling device with a mating optical coupling device. In embodiments that use direct waveguide-to-waveguide coupling, the elements of the optical coupling device that receive and secure the optical waveguides aim the waveguides, and thus the optical signal, toward the waveguides of the mating optical coupling device. If the optical coupling device uses light affecting elements, e.g., lenses or mirrors, in the light signal path, the light affecting elements may further aim and/or focus the optical signal from the waveguides toward light affecting elements of the mating optical coupling device.

Embodiments described herein provide approaches for reducing variation loss of the optical signal passing through the optical interface. Variation in the optical signal can arise from misalignment of various features within the optical coupling device. Variation in the optical signal can arise due to alignment error between the light affecting elements, e.g., lenses, mirrors, etc., of an optical coupling device and the mating alignment features of the optical coupling device. Approaches described in this disclosure involve assembling an optical coupling device using waveguides to register the optical elements to the mating alignment features within the optical coupling device.

Variation in the optical signal can arise due to the difference in thermal expansion between the optical waveguide material and the component that secures the waveguides. For example, optical waveguides may be made of materials such as glass, which has a lower coefficient of thermal expansion when compared with the coefficient of thermal expansion of materials like injection-molded thermoplastics (e.g. liquid crystal polymers) used to make the ferrule shell or other component that secures the waveguides. Approaches described in this disclosure involve securing the optical waveguides between components made of materials having the same or similar coefficient of thermal expansion. Securing the optical waveguides between components having the same or similar coefficients of thermal expansion can reduce misalignment of the waveguides due to bending or warping of the ferrule or other components to which the waveguides are secured.

Furthermore, embodiments described herein provide approaches for enhancing the optical signal through the use of appropriate selection of materials. For example, materials particularly suited for use as mechanical mating alignment features may differ from materials that are particularly suited to form light affecting elements such as lenses and/or mirrors. When the optical coupling device includes light affecting elements, it is sometimes beneficial to use a first material to form the first piece of the optical coupling device that includes the light affecting elements and to use a second material to form the second piece that includes mating alignment features. The use of different materials for the first and second pieces allows the materials used for each piece to be better suited for its particular function. For example, the first piece may be made of an optical polymer such as polyetherimide, and the second piece may be made of a structural polymer such as a glass-particle-loaded thermoplastic, or a liquid crystal polymer. The second piece could also be metal, e.g. die-cast zinc.

Optical coupling devices disclosed herein are multi-piece coupling devices comprising at least a first piece and a second piece with one or more waveguides secured between the first and second pieces of the optical device. The embodiments discussed herein illustrate waveguide-assisted registration between multiple pieces of the optical coupling device. In some embodiments, a first piece of the optical coupling device includes receiving elements for receiving and securing the optical waveguides. The first piece also includes light affecting elements that affect one or more characteristics of light from the optical waveguides as the light propagates in the optical coupling device. A second piece of the optical coupling device includes the mating alignment features. In some embodiments, a first piece of the optical coupling device includes the receiving elements and fine mating alignment features and a second piece of the optical coupling device includes coarse mating alignment features.

Registration of the first piece of the optical coupling device to the second piece of the optical coupling device is achieved by registering the first and second pieces to waveguide fibers or an to array of waveguides. In some embodiments, each of the pieces of a multi-piece optical device may be a unitary molded piece. In some embodiments, at least one of the pieces, e.g., the second piece, may include a latch for securing the optical coupling device to a mating optical coupling device.

Figure 1A:
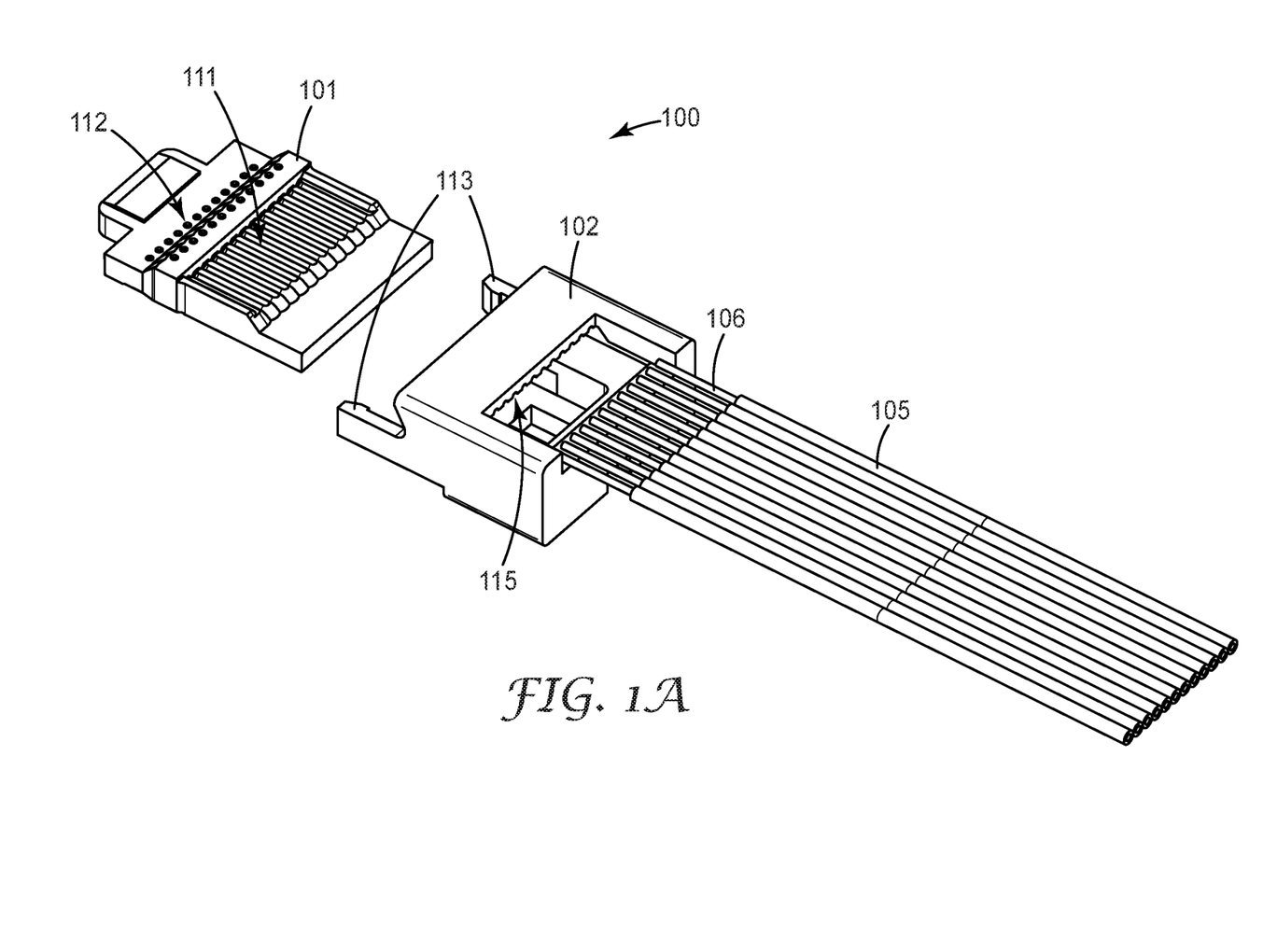
FIGS. 1A through 1E are various views of a two-piece optical coupling device that provides for waveguide-assisted registration between the pieces in accordance with some embodiments.

FIGS. 1A through 1E provide various views of a two-piece optical coupling device 100 that provides for waveguide assisted registration between the first piece 101 and the second piece 102. FIG. 1A is an exploded perspective view of an optical coupling device 100 in accordance with some embodiments. The first piece 101 includes one or more first receiving elements 111 configured to receive and secure one or more optical waveguides 105, e.g., optical waveguide fibers. The term optical waveguide is used herein to refer to an optical element that propagates signal light. An optical waveguide comprises at least one core with a cladding, wherein the core and cladding are configured propagate light within the core, e.g., by total internal reflection. An optical waveguide may be, for example, a single core fiber, a multi-core optical fiber, or a polymeric waveguide. A waveguide may have any suitable cross sectional shape, e.g., circular, square, rectangular etc. In the illustrated embodiment, the first piece 101 of the optical coupling device 100 also includes one or more light affecting elements 112 configured to affect light from the optical waveguides 105 as the light propagates through the optical coupling device 100.

The second piece 102 of the optical coupling device 100 includes one or more second receiving elements 115 configured to receive and secure the optical waveguides 105. The second piece 102 also includes mechanical mating alignment features 113 configured to align the optical coupling device 100 with a mating optical coupling device 129 (not shown in FIG. 1A but shown in FIGS. 1D and 1E).

In the embodiment illustrated in FIGS. 1A through 1E, the first receiving elements 111 comprise grooves, each groove 111 configured to receive and secure a portion 106 of an optical waveguide fiber 105 that has the buffer coating stripped away, exposing the cladding of the waveguide. The second piece 102 includes grooves 115 that are configured to receive and secure the portion 106 of the optical waveguide fibers 105. In various embodiments, the first piece 101 and the second piece 102 may have the same number of grooves 111, 115 and/or the general shape and/or pattern of the grooves 115. In alternative embodiments, the grooves of the first piece and the grooves of the second piece may differ in shape, number and/or pattern.

Figure 1B:
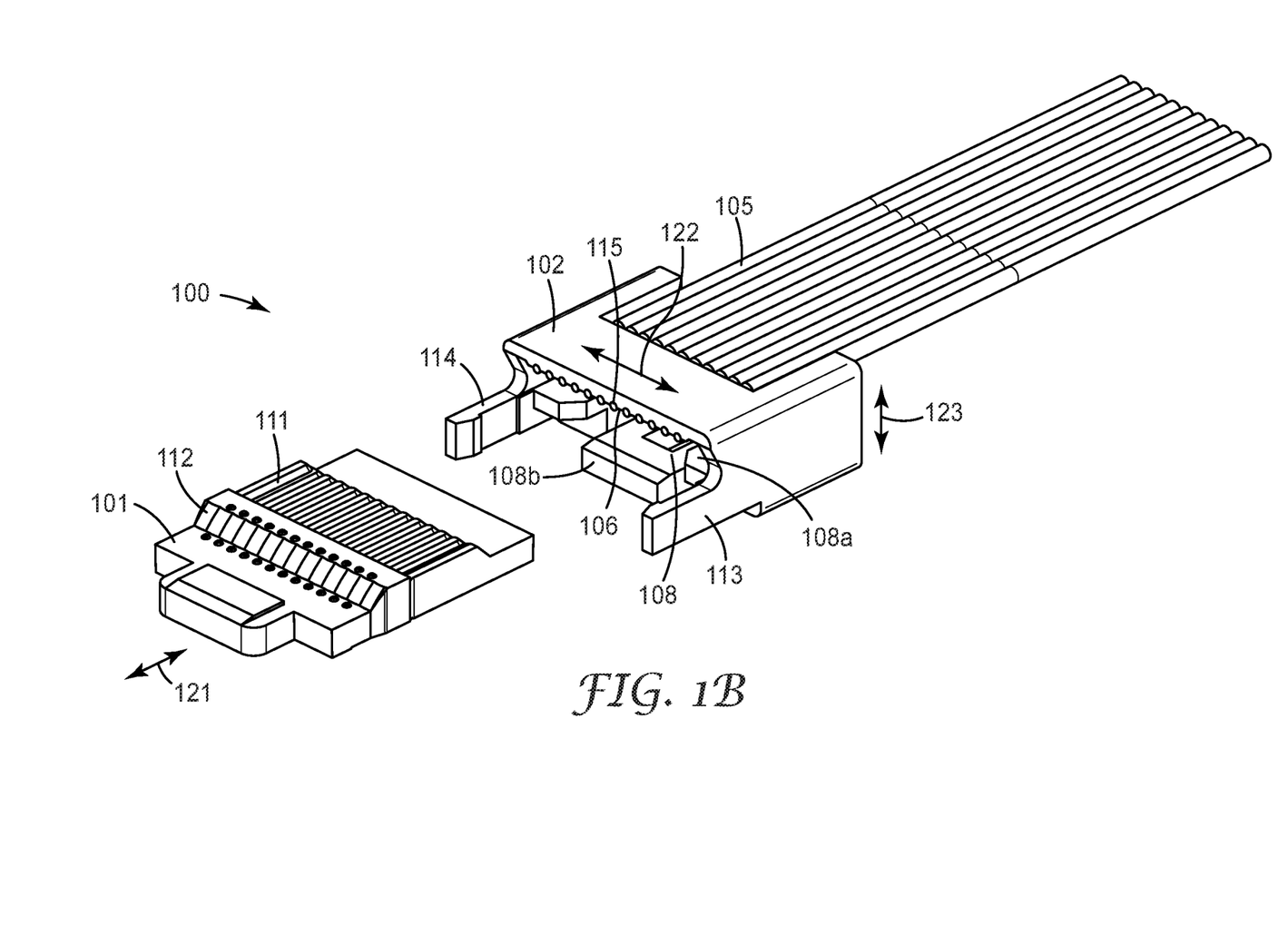
Figure 1C:
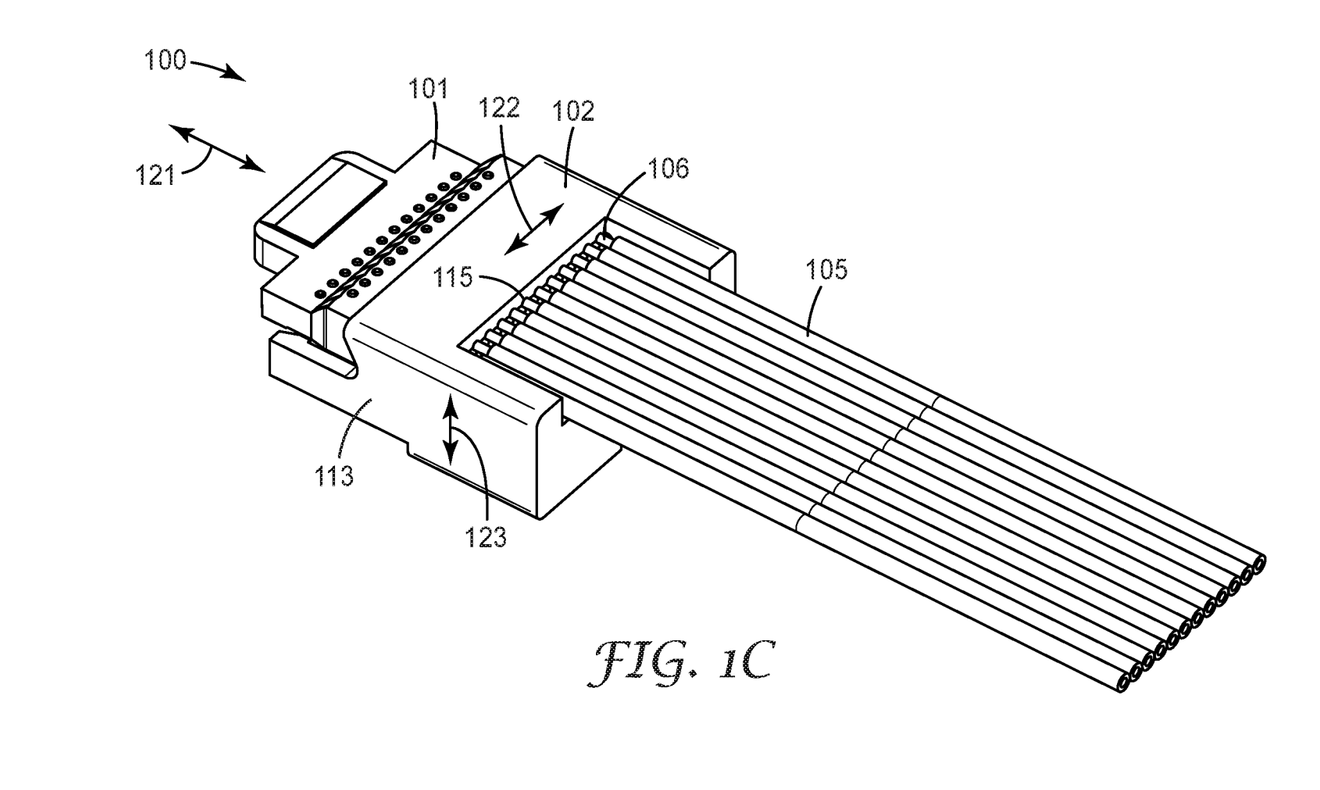

FIG. 1B provides an exploded perspective view of the optical coupling device 100 showing the exposed portions 106 of optical waveguides 105 disposed and secured in the grooves 115 of the second piece 102. When the two pieces 101, 102 of the optical coupling device 100 are assembled together, as illustrated in FIG. 1C, the bare optical waveguide portions 106 collectively serve as a registration feature that aligns the first piece 101 with the second piece 102.

The mating alignment features shown in FIGS. 1A through 1E comprise arms 113 that extend from the second piece 102 along the mating axis 121 of the optical coupling device 100. In some embodiments, after mating with the mating optical coupling device 129, the arms 113 control alignment of the optical coupling device 100 along the mating axis 121 and/or along the lateral axis 122 which is orthogonal to the mating axis 121. For example, to control mating axis or lateral axis alignment, the arms 113 may directly engage compatible features on the mating optical device.

In some embodiments, the arms 113 can be flexible and designed to flexibly press against the sides of the mating optical coupling device. Flexible side arms 113 facilitate alignment of the light affecting elements 112 of the optical coupling device 100 and the light affecting elements of the mating optical coupling device. In equilibrium, the forces created by the flexing of the four arms of the optical coupling device and the mating optical coupling device balance to align the optical coupling devices relative to each other. In some embodiments, the ends of the arms provide forward stops that control translation along the mating axis 121.

The material forming the compliant features and/or the geometry of the compliant features can be selected to provide a desired alignment force between ferrules. For example, the alignment force provided by the compliant features can be increased or decreased by choosing a material for the compliant features with a higher or lower Young's modulus, respectively. As another example, in embodiments utilizing flexible arms, the alignment force provided by the flexible arms can be increased or decreased by choosing larger or smaller cross-sectional areas, respectively, for the flexible arms. Useful alignment forces can be obtained by choosing an injection moldable polymer for both a body of the ferrule and the compliant features of the ferrule and by choosing a geometry of the compliant features that can be injection molded along with the body of the ferrule. In this way, for example, a unitary ferrule having compliant features that provide a desired alignment force can be made in an injection molding process. Additional details regarding optical ferrules and/or flexible alignment features are provided in commonly owned and concurrently filed U.S. patent application Ser. No. 62/240,066, having the title "Ferrules, Alignment Frames and Connectors," and U.S. patent application Ser. No. 62/240,069, having the title "Optical Ferrules" which is incorporated herein by reference.

Figure 1D:
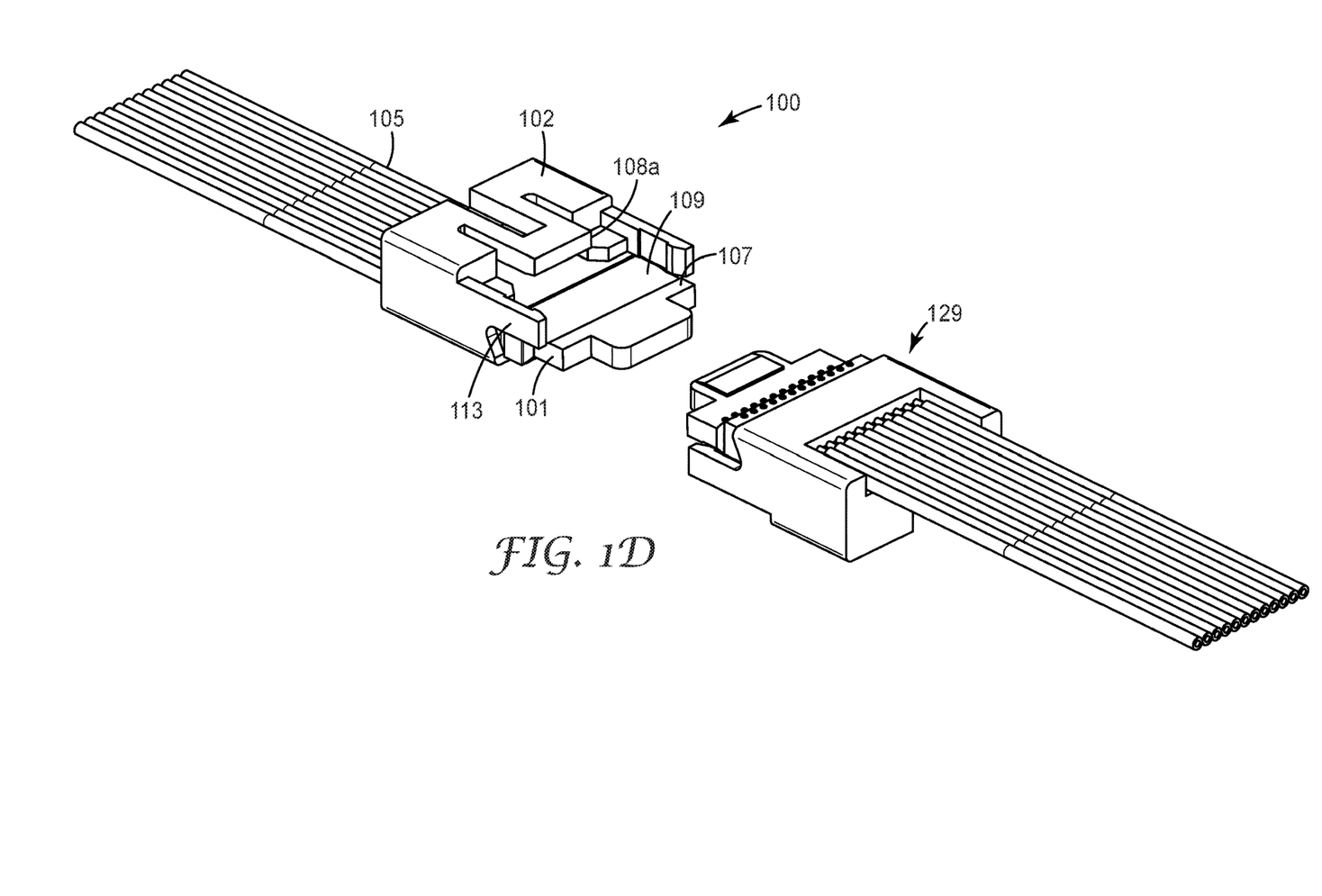
Figure 1E:
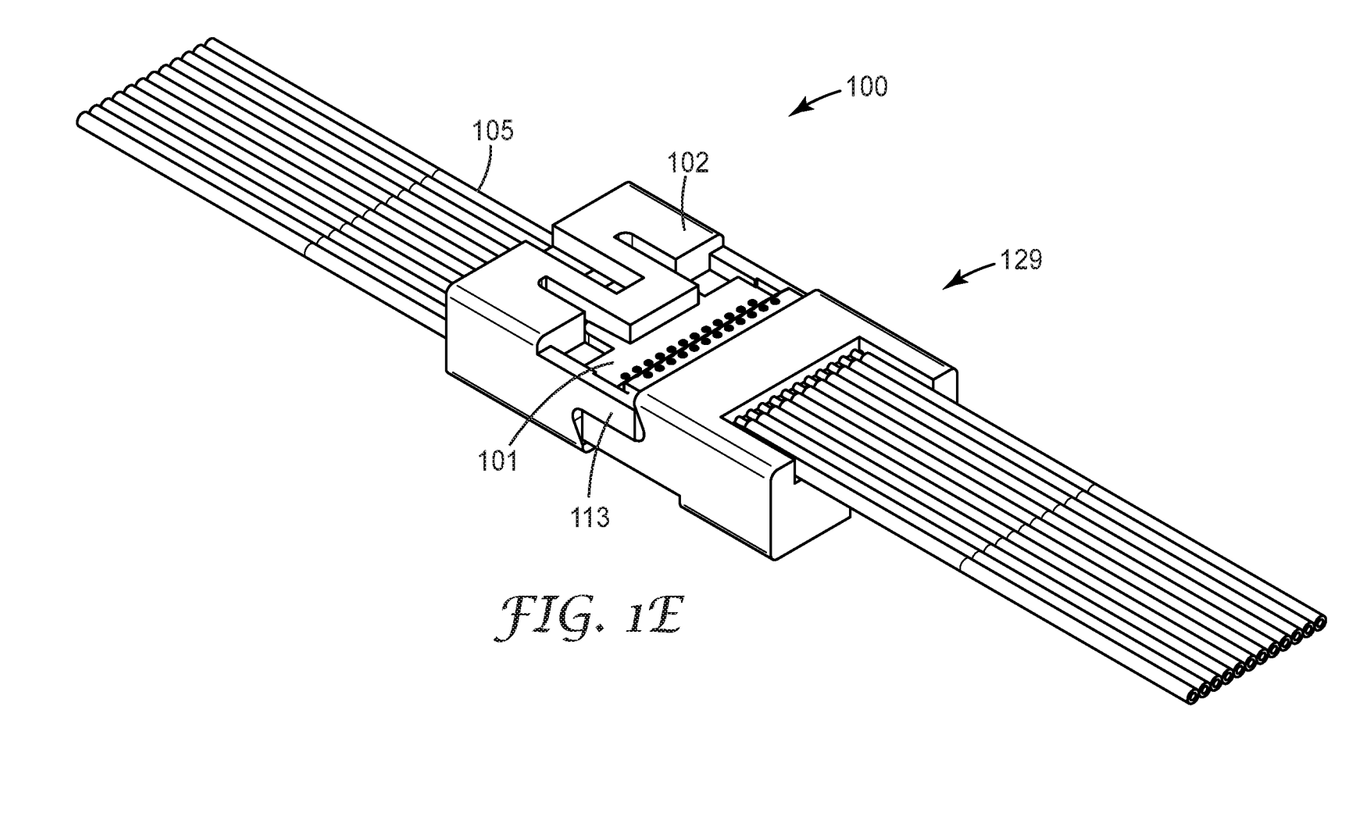

In some embodiments, the optical coupling device 100 includes a latching mechanism that is configured to secure the optical coupling device 100 to a mating optical coupling device 129 after the optical coupling devices 100, 129 are mated. This may be accomplished by providing the flexible side arms 113 with features (e.g. a protrusion) which can interlock with a corresponding feature (e.g. a recess) in the mating connector. Such a configuration can produce a retaining force along the mating direction that holds the mating connectors together, that is, provides alignment along the mating direction. A suitable latching mechanism for securing the optical coupling devices 100, 129 together after mating is described in commonly owned and concurrently filed U.S. patent application Ser. No. 62/239,998 having the title "Connector with Latching Mechanism," which is incorporated herein by reference.

FIG. 1D shows a bottom view of the optical coupling device 100 and a top view of a mating optical coupling device 129 just prior to mating. FIG. 1E shows the optical coupling device 100 and the mating optical coupling device 129 after mating. The bottom view of the optical coupling device 100 shown in FIG. 1D depicts a sliding surface 107 that includes an optical input/output window 109 disposed in the first piece 101. The sliding surface 107 is configured to slide against a compatible mating surface during mating of the optical coupling device 100 and the mating optical coupling device 129. In the embodiment shown in FIGS. 1A through 1E, light from the waveguides 105 propagating in the optical coupling device 100 is redirected by light affecting elements 112 and exits the optical coupling device 100 after being transmitted by the optical input/output window 109. The mating optical coupling device 129 receives the light through its input/output window and the light affecting elements of the mating optical coupling device redirect the light into the waveguides attached to the mating optical coupling device.

In some embodiments, as shown in FIG. 1D, the second piece 102 may include a cavity 108 and/or first and second clip portions 108a, 108b configured to hold the first piece 101. Assembling the two-piece optical coupling device 100 can involve adhesively securing portions 106 of the waveguides 105 to the receiving and securing elements 115 of the second piece 102. The first piece 101 is then inserted at least partially into the cavity 108 of the second piece 102 and the first piece 101 is secured by the clips 108a, 108b. The clips 108a, 108b are configured to exert a force on the first piece 101 along the thickness axis 123 which is orthogonal to the mating and lateral axes 121, 122 to retain the first piece 101 in the cavity 108 of the second piece 102.

As the first piece 101 is inserted into the second piece 102, waveguide-assisted registration between the first and second pieces 101, 102 occurs. The receiving elements 111 of the first piece 101 receive the portions 106 of the waveguides 105 that are secured to elements 115 of the second piece 102, thus aligning the first piece 101 with the second piece 102 using the waveguides 105 as the registration feature between the two pieces 101, 102. The waveguide portions 106 are secured, e.g., by an adhesive, to the elements receiving of the first piece 101. In an alternative approach, the waveguide portions 106 may be first secured to the first piece 101, such that when the first piece 101 is inserted into the cavity 108 of the second piece 102, the waveguide portions 106 secured to the first piece 101 engage the grooves 115 of the second piece 102 registering the second piece 102 to the first piece 101. In another alternative approach, the first and second pieces are assembled over the waveguides, and then adhesive is applied to the assembly, using surface tension to pull the adhesive along the waveguides and receiving elements.

FIGS. 2A through 2E provide various views of a two-piece optical coupling device 200 that provides for waveguide-assisted registration between the pieces 201, 202. In this embodiment, the first piece 201 includes fine mating alignment features 214 and the second piece 202 includes coarse mating alignment features 213. The coarse mating alignment features 213 are configured to provide for mating alignment with a mating optical device with a more relaxed mating tolerance when compared to the fine mating alignment features 214 which provide mating alignment with a relatively tighter tolerance. In some embodiments, the second (coarse) mating alignment features are configured to engage with compatible mating alignment features of the mating optical coupling device before engagement of the first (fine) mating alignment features. In some embodiments, the coarse mating alignment features 213 provide positive retaining force to hold the first pieces of the mating connectors together, thus ensuring seating of the fine alignment features 214, and optical alignment along the mating direction.

Waveguide-assisted registration of the first and second pieces 202 of the optical coupling device provides for precise alignment of the coarse 213 and fine 214 mating alignment features of the optical coupling device 200. The optical coupling devices that employ waveguide assisted registration as described herein may include first and/or second pieces that are hermaphroditic (including both male and female components) or the first and/or second pieces may be non-hermaphroditic. In the embodiments shown in FIGS. 2A through 2E, the fine alignment features 214 of the first piece are non-hermaphroditic.

Figure 2A:
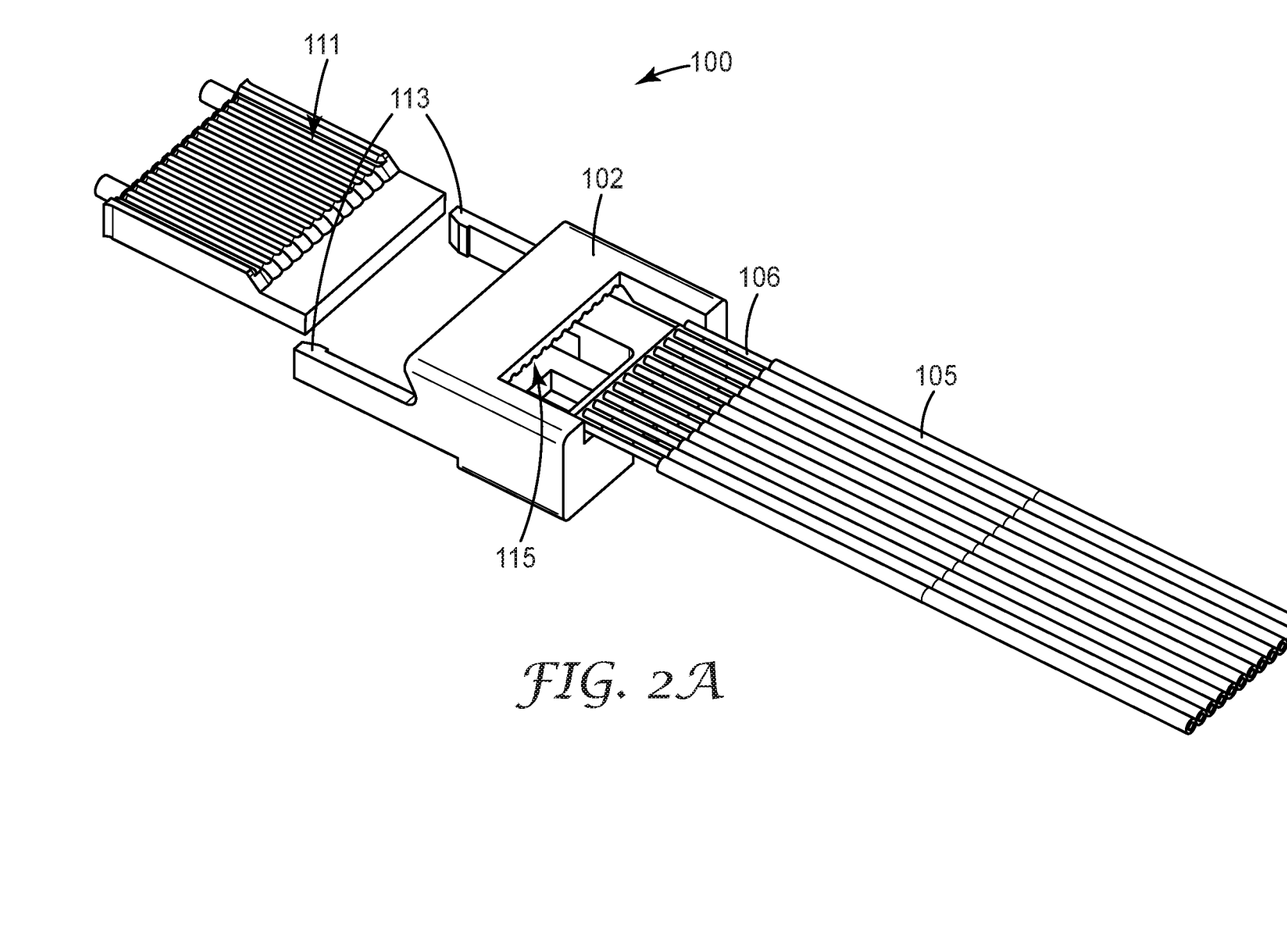
FIGS. 2A through 2E provide various views of a two-piece optical coupling device that provides for waveguide-assisted registration between the pieces in accordance with some embodiments.
Figure 2B:
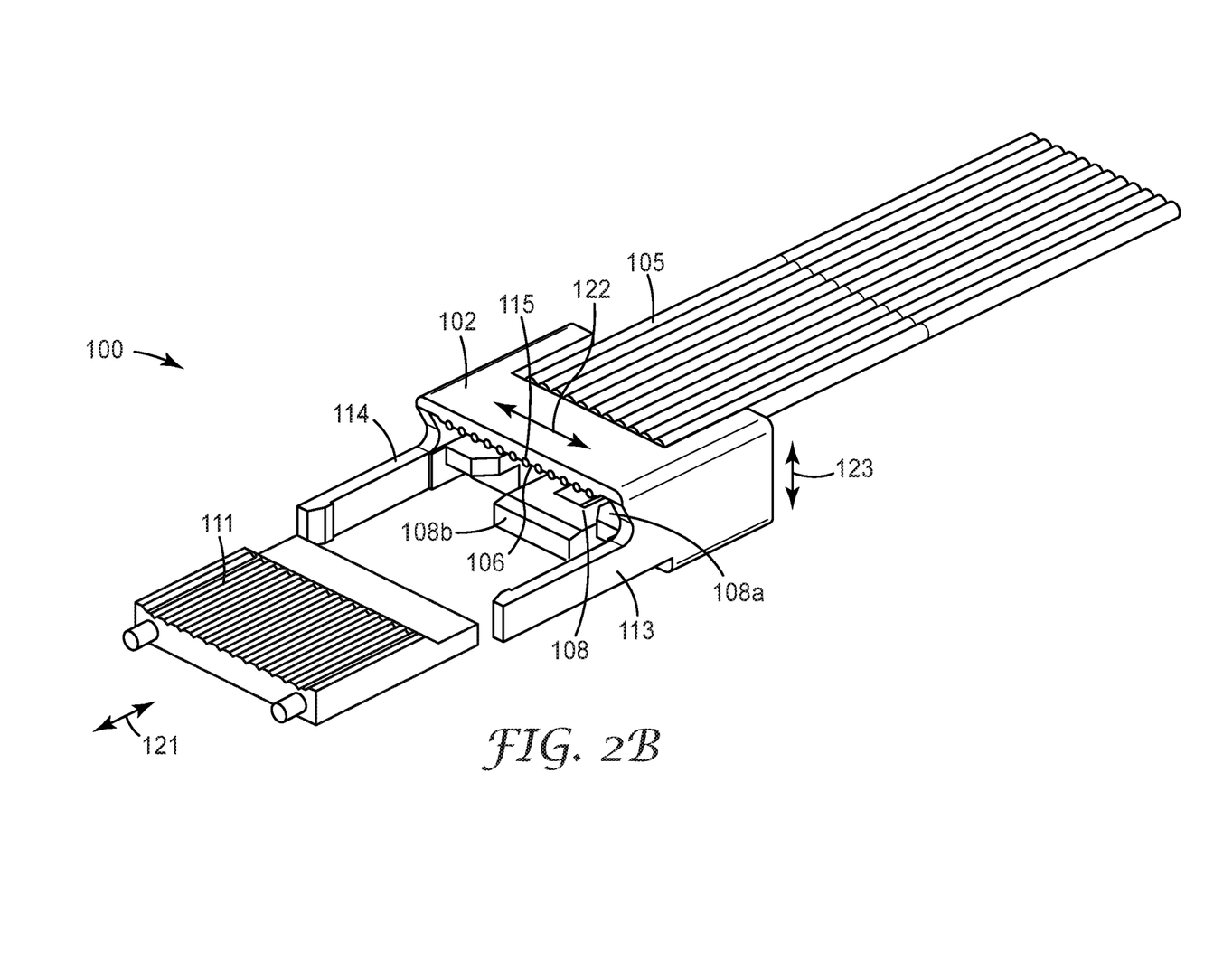

FIGS. 2A and 2B are perspective views of a first piece 201 and a second piece 202 of the optical coupling device 200 prior to assembling the optical coupling device. The first piece 201 includes one or more elements 211 configured to receive and secure one or more optical waveguides 205 and fine mating alignment features comprising pins 214 that extend from the first piece along the mating axis 121. The pins 214 are configured to engage with compatible sockets of a mating optical coupling device.

The second piece 202 includes one or more elements 215 configured to receive and secure the optical waveguides 205 and also includes coarse mating alignment features 213. The coarse mating alignment features 213 and the fine mating alignment features 214 are configured to provide course and fine alignment, respectively, between the optical coupling device 200 with a mating optical coupling device 229 (not shown in FIG. 2A but shown in FIGS. 2D and 2E). The coarse alignment features 213 engage with the mating connector first, thereby assisting in guiding the fine alignment features 214 into registration with mating fine alignment features.

Figure 2C:
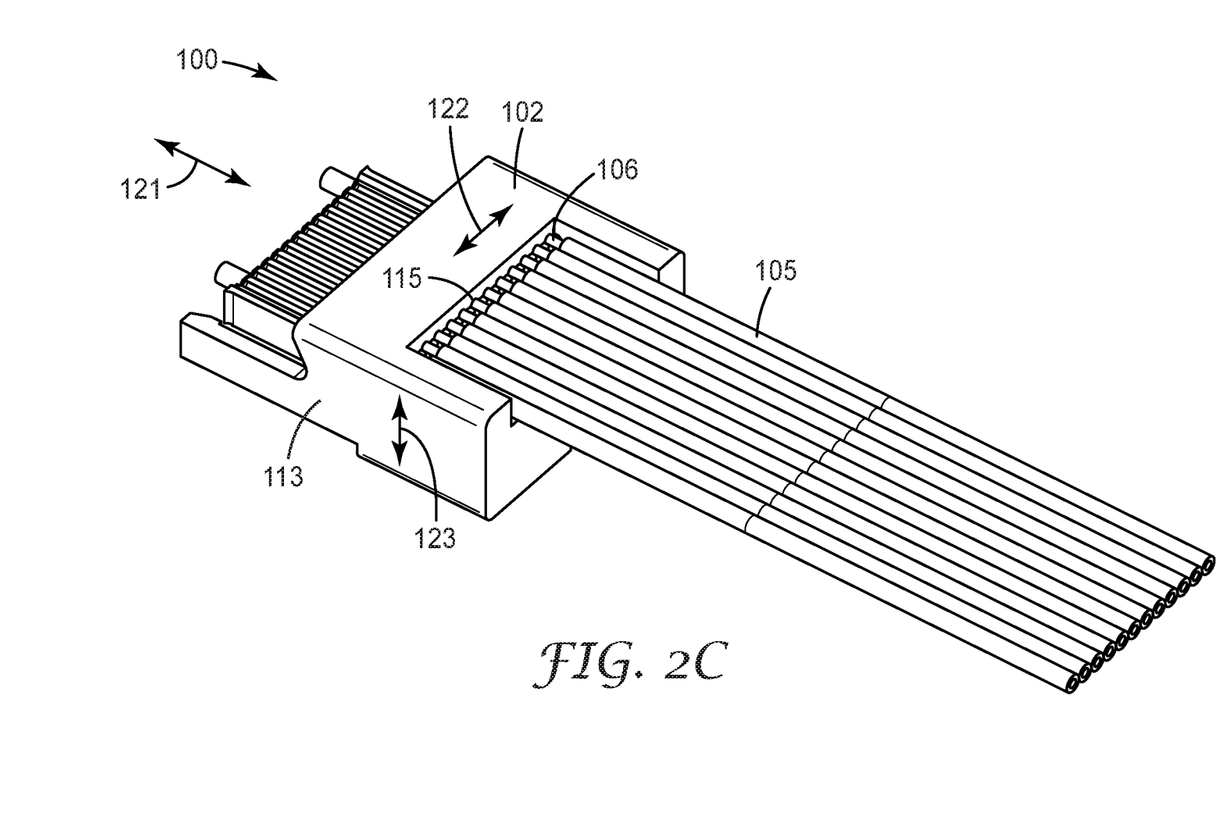

In the embodiment illustrated in FIG. 2A through 2E, the receiving and securing elements 211 of the first piece 201 comprise grooves, each groove 211 configured to receive and secure a portion 206 of an optical waveguide fiber 205 that has the buffer coating stripped away exposing the cladding of the waveguide. Although waveguide assisted registration can alternatively be accomplished using waveguides having the buffer coating intact, more precise alignment is accomplished using bare waveguide portions 206. As depicted in FIGS. 2A and 2B, the second piece 202 includes grooves 215 that are configured to receive and secure the optical waveguide fibers 205 which are similar in shape, pattern and number to grooves 211. When the two pieces 201, 202 of the optical coupling device 200 are assembled together, as shown in FIG. 2C, the bare optical waveguide portions 206 collectively serve as a registration feature that aligns the first piece 201 with the second piece 202. The optical waveguides 205 can be secured to the grooves 211 and the grooves 215 by an adhesive. The second piece 202 may include a cavity 208 as shown in FIGS. 2A and 2B and/or clips 208a,b that serve to hold the first piece 201 in the cavity 208 of the second piece 202.

The optical coupling device 200 is assembled by bringing the first and second pieces 201, 202 together, e.g., by inserting the first piece 201 into the cavity 208 of the second piece 202. As the first piece 210 is inserted into the cavity 208 of the second piece 202, fiber assisted registration between the first and second pieces 201, 202 occurs. The receiving elements 211 of the first piece 201 receive the portions 206 of the waveguides 205 that are secured to elements 215 of the second piece 202, thus aligning the first piece 201 with the second piece 202 using the waveguides 205 as the registration feature between the two pieces 201, 202. The waveguide portions 206 are secured, e.g., by an adhesive, to the elements 211 of the first piece 201. In an alternative approach, the waveguide portions 206 may be first secured to the receiving elements 211 of the first piece 201, such that when the first piece 201 is inserted into the cavity 208 of the second piece 202, the waveguide portions 206 secured to the first piece 201 engage the grooves 215 of the second piece 202 registering the second piece 202 to the first piece 201. First and second pieces may also be assembled over the waveguides before adhesive is allowed to flow onto the waveguides and grooves.

Figure 2D:
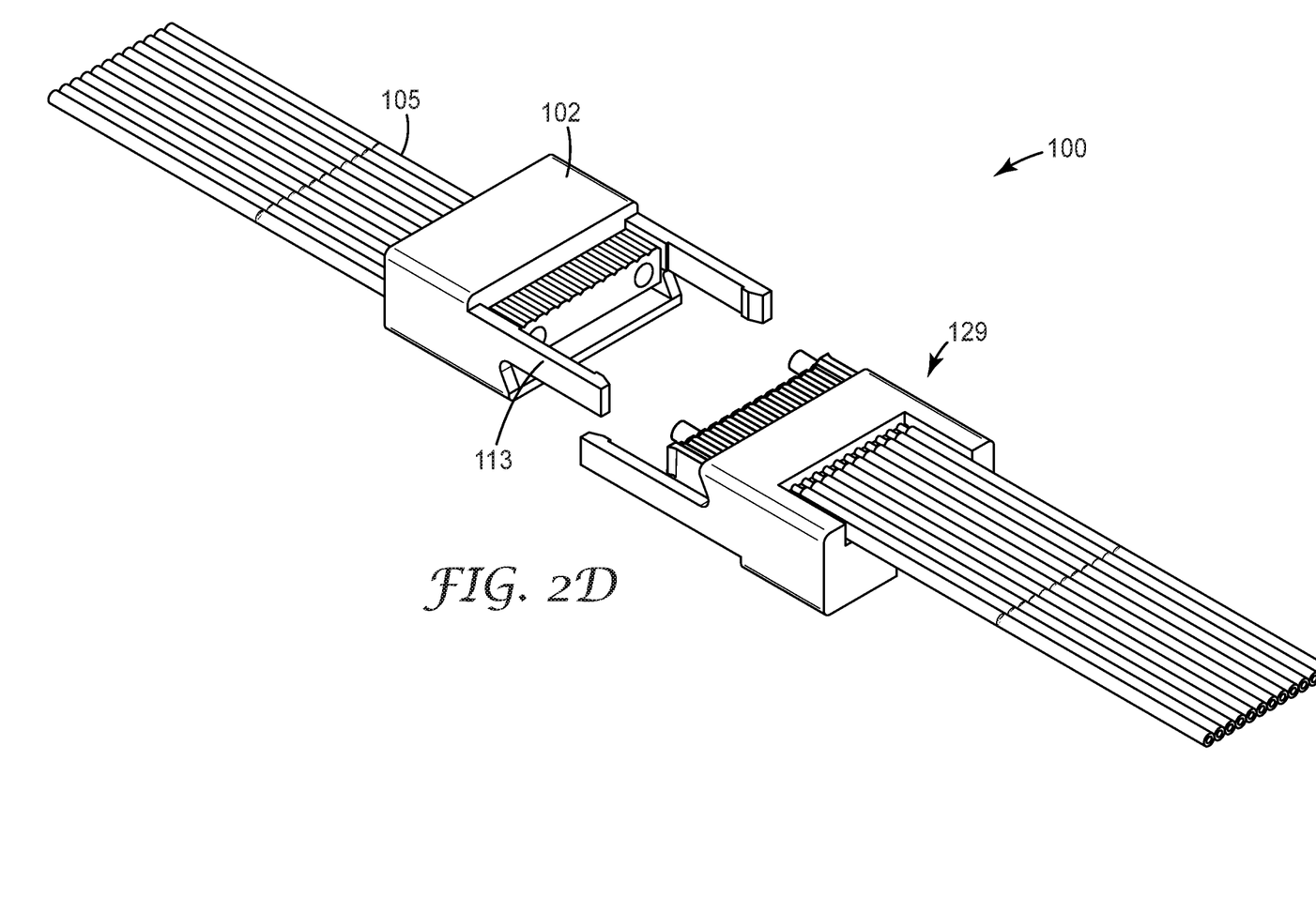
Figure 2E:
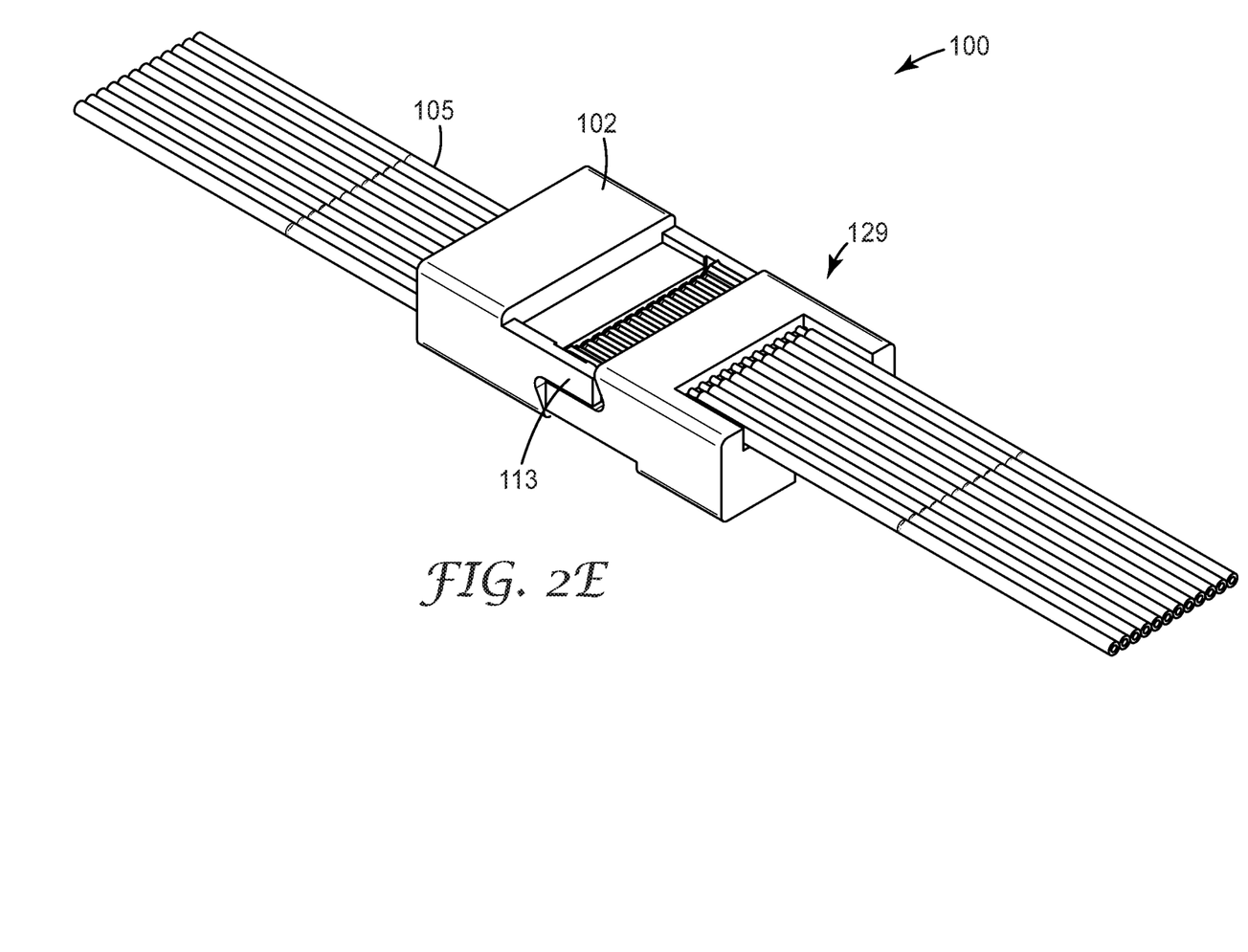

FIG. 2D shows a perspective view of the optical coupling device 200 and a mating optical coupling device 229 just prior to mating. FIG. 2E shows the optical coupling device 200 and the mating optical coupling device 229 after mating. In the embodiment shown in FIGS. 2A through 2E, the ends of the waveguides 205 secured by the optical coupling device 200 are stripped of their buffer coating, and the ends of the waveguides are cleaved and polished. After the optical coupling device 200 and the mating optical coupling device 229 are mated, the polished ends of each waveguide 205 of the optical coupling device 200 are disposed in-line and touching or in close proximity to a waveguide of the mating optical coupling device 229. Light from the waveguides 205 of the optical coupling device 200 is directed into the waveguides of the mating optical coupling device 229 to provide the optical signal connection. The waveguides may also be polished after being bonded to the first piece (in which case the alignment pins are added after polishing).

After mating with a mating optical coupling device 229, the fine alignment features 214 and the coarse alignment features 213 control alignment of the optical coupling device 200 with the mating optical coupling device 229. In some embodiments, the optical coupling device 200 includes a latching mechanism that is configured to secure the optical coupling device 200 to a mating optical coupling device 229 after the optical coupling devices 200, 229 are mated.

Figure 3:
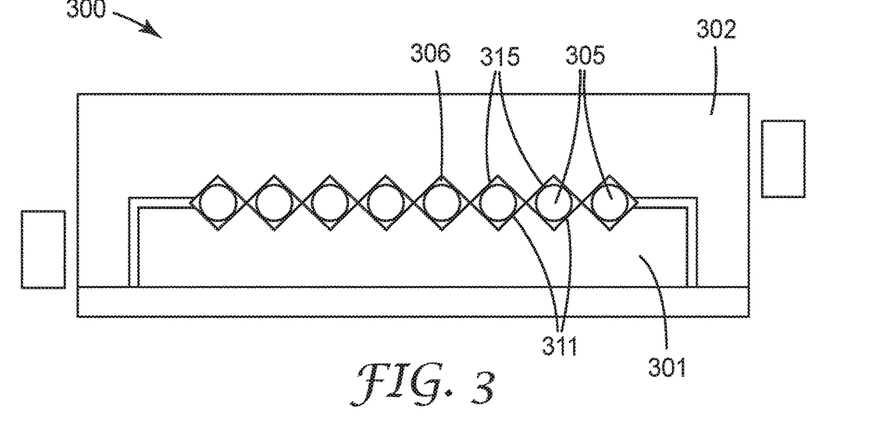
FIG. 3 is a cross sectional view of a portion of an optical coupling device that includes grooves on the first and second pieces configured to receive waveguides for fiber assisted registration between the first and second pieces.
Figure 4:
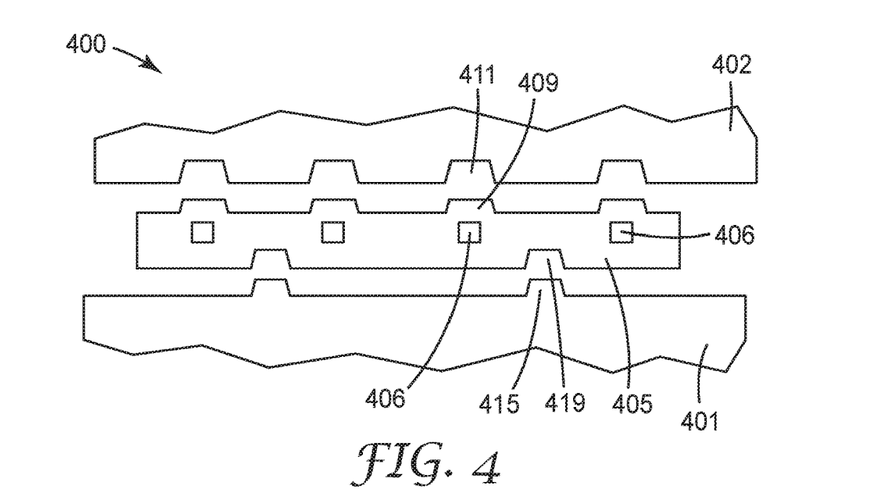
FIGS. 4 and 5 provide cross sectional views of portions of optical coupling devices wherein a waveguide array is used to register the first piece of an optical coupling device to a second piece of an optical coupling device in accordance with some embodiments.
Figure 5:
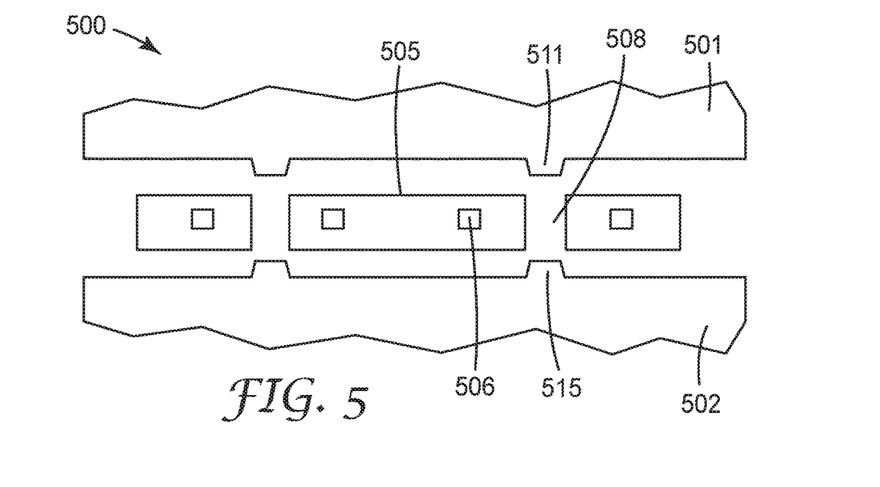

FIGS. 3 through 5 provide cross sectional views of several alternative embodiments of elements configured for receiving and securing the waveguides for fiber assisted registration as discussed herein. In many embodiments, the receiving and securing elements of the first piece and the receiving and securing elements of the second piece will have the same general shape, number, and/or pattern. In some embodiments the shape, number, and/or pattern of and the receiving and securing elements of the first piece and the receiving and securing elements of the second piece may differ.

FIG. 3 is a cross sectional view of a portion of an optical coupling device 300 that includes first and second pieces 301, 302 that include grooves 311, 315 configured to receive and secure the waveguides 305. An adhesive 306 is disposed between the waveguides 305 and the first and second pieces 301, 302 to secure the waveguides 305 to the first and second pieces 301, 302. The grooves are illustrated in FIG. 3 as v-shaped grooves, although grooves of any shape, e.g., u-shaped grooves or y-shaped grooves forming a rounded or square channel, could be used. Grooves that are suitable for use in a two piece optical coupling device that employs waveguide assisted registration are described in commonly owned and concurrently filed U.S. patent application Ser. No. 62/240,009, having the title "Optical Waveguide Registration Feature," which is incorporated herein by reference.

In some embodiments, the optical waveguides may be optical waveguide fibers shown in the embodiments discussed above. In some embodiments the waveguides may be arranged as a waveguide array, e.g., a polymer waveguide array. For example, in some embodiments the optical waveguides may comprise an array of one or more integrated optical waveguides fabricated in a substrate. In some embodiments, the optical waveguides may be arranged in a waveguide array film. The waveguide array may be used to register the first piece to the second piece of a multi-piece optical coupling device.

FIGS. 4 and 5 provide cross sectional views of a portion of optical coupling devices 400, 500 wherein a waveguide array 405, 505 is used to register the first piece 401, 501 to a second piece 402, 502 of an optical coupling device 400, 500. FIGS. 4 and 5 illustrate a waveguide array 405, 505, comprising waveguide cores 406, 506 arranged in a film 407, 507 wherein the waveguide array 405, 505 is used for waveguide assisted registration of a first piece 401, 501 and a second piece 402, 502 of an optical coupling device 400, 500. In the embodiment of FIG. 4, the second piece 402 includes waveguide assisted registration elements comprising grooves 411 that are configured to engage with ridges 409 in the waveguide array 405. The first piece 401 includes waveguide assisted registration elements comprising ridges 415 in the array 405 that are configured to engage with grooves 419 in the second piece 402. In FIG. 5, the waveguide assisted registration elements comprise ridges 511, 515 in the first and second pieces 501, 502 that are configured to engage with vias 508 through the waveguide film 505.

The materials used for the first and second pieces 301, 401, 501, 302, 402, 502 may be the same or the material used for the first piece 301, 401, 501 may be different from the material used for the second piece 302, 402, 502. In some embodiments, the material of the first piece 301, 401, 501 may be selected for its optical characteristics and suitability to form light affecting elements such as lenses and/or mirrors. The material of the second piece 302, 402, 502 may be selected for its mechanical properties and suitability to form mechanical mating alignment features. In some embodiments the coefficient of thermal expansion of the material of the first piece 301, 401, 501 is similar or substantially equal to the coefficient of thermal expansion of the material of the second piece 302, 402, 502.

Additional information regarding ferrules, alignment frames, and connectors that may be used in conjunction with the approaches described herein is provided in the following commonly owned and concurrently filed U.S. patent applications which are incorporated herein by reference: U.S. Patent Application Ser. 62/239,998, having the title "Connector with Latching Mechanism"; U.S. Patent Application Ser. 62/240,069, having the title "Optical Ferrules"; U.S. Patent Application Ser. 62/240,066, having the title "Ferrules, Alignment Frames and Connectors,"; U.S. Patent Application Ser. 62/240,008, having the title "Optical Cable Assembly with Retainer,"; U.S. Patent Application Ser. 62/240,000, having the title "Dust Mitigating Optical Connector,"; U.S. Patent Application Ser. 62/240,009, having the title "Optical Waveguide Registration Feature,"; U.S. Patent Application 62/239,996, having the title "Optical Ferrules and Optical Ferrule Molds,"; U.S. Patent Application 62/240,002, having the title "Optical Ferrules with Waveguide Inaccessible Space,"; U.S. Patent Application 62/104,196, having the title "Configurable Modular Connectors,"; and U.S. Patent Application 62/240,005, having the title "Hybrid Connectors,".

Items described in this disclosure include:

Item 1. An optical coupling device comprising:
 a first piece comprising:
  one or more first receiving elements configured to receive and secure one or more optical waveguides; and
  one or more light affecting elements configured to affect one or more characteristics of light from the optical waveguides while propagating the light within the optical ferrule; and
 a second piece, separate from the first piece, the second piece comprising:
  one or more second receiving elements configured to receive the waveguides, the first receiving elements and the second receiving elements configured to align the second piece and the first piece using the optical waveguides; and
  one or more mating alignment features configured to engage with a mating optical coupling device and to align the optical coupling device with the mating optical coupling device.

Item 2. The optical coupling device of item 1, wherein the first piece is a first unitary molded piece and the second piece is a second unitary molded piece.

Item 3. The optical coupling device of any of items 1 through 2, wherein the first piece comprises a first material and the second piece comprises a second material different from the first material.

Item 4. The optical coupling device of any of items 1 through 3, wherein the first piece has a coefficient of thermal expansion that is substantially the same as a coefficient of thermal expansion of the second piece.

Item 5. The optical coupling device of any of items 1 through 4, wherein the first piece fits at least partially within a cavity the second piece.

Item 6. The optical coupling device of any of items 1 through 5, wherein the second piece includes clips configured to hold the first piece.

Item 7. The optical coupling device of any of items 1 through 6, wherein the first piece includes at least one mating alignment feature.

Item 8. The optical coupling device of item 7, wherein the at least one mating alignment feature of the first piece comprises a pin configured to engage with a socket of a mating optical coupling device.

Item 9. The optical coupling device of any of items 1 through 8, wherein the first piece includes a surface that is configured to slidably mate with a surface of a mating optical coupling device.

Item 10. The optical coupling device of any of items 1 through 9, wherein the one or more characteristics of the light propagating within the optical coupling device include one or more of a direction and divergence of the light.

Item 11. The optical coupling device of any of items 1 through 10 further comprising an output surface, the light propagating within the optical coupling device exiting the optical coupling device after being transmitted by the output surface, the output surface disposed in the first piece.

Item 12. The optical coupling device of any of items 1 through 11, wherein the mating alignment features of the second piece comprise forward stops.

Item 13. The optical coupling device of any of items 1 through 12, wherein the mating alignment features of the second piece comprise arms that extend from the second piece.

Item 14. The optical coupling device of item 13, wherein the arms are flexible.

Item 15. The optical coupling device of item 14, wherein the arms are configured to flexibly engage with sides of a mating optical coupling device and to provide lateral mating alignment between the optical coupling device that the mating optical coupling device.

Item 16. The optical coupling device of any of items 1 through 15, wherein at least one of the first and second receiving elements comprise grooves.

Item 17. The optical coupling device of any of items 1 through 16, wherein the optical waveguides are optical fibers.

Item 18. The optical coupling device of any of items 1 through 15, wherein at least one of first and second receiving elements comprises ridges.

Item 19. The optical coupling device of item 1, wherein the optical waveguides are an array of one or more integrated optical waveguides fabricated in a substrate.

Item 20. The optical coupling device of item 1, wherein the optical waveguides are arranged in a waveguide array film.

Item 21. The optical coupling device of item 20, wherein the waveguide film includes features configured to engage with at least one of the receiving elements of the first piece and the second piece.

Item 22. The optical coupling device of item 21, wherein the features of the optical waveguide film comprise at least one of ridges, grooves, and vias.

Item 23. The optical coupling device of any of items 1 through 22, wherein the first piece and the second piece are pieces of an optical ferrule.

Item 24. The optical coupling device of any of items 1 through 23, wherein the first piece is an optical ferrule and the second piece is a housing of an optical connector.

Item 25. An optical coupling device comprising:
- a first piece comprising:
  - one or more first receiving elements configured for receiving and securing one or more optical waveguides;
  - one or more first mating alignment features configured to align the optical coupling device with a mating optical coupling device; and
- a second piece, separate from the first piece, the second piece comprising:
  - one or more second receiving elements configured for receiving the waveguides, the first receiving elements and the second receiving elements configured to align the second piece and the first piece using the optical waveguides; and
  - one or more second mating alignment features configured to engage with a mating optical coupling device and to align the optical coupling device with a mating optical coupling device.

Item 26. The optical coupling device of item 25, wherein the first piece is a first unitary molded piece and the second piece is a second unitary molded piece.

Item 27. The optical coupling device of any of items 25 through 26, wherein the first piece comprises a first material and the second piece comprises a second material different from the first material.

Item 28. The optical coupling device of any of items 25 through 27, wherein the first piece has a coefficient of thermal expansion that is about the same as a coefficient of thermal expansion of the second piece.

Item 29. The optical coupling device of any of items 25 through 28, wherein the first piece fits at least partially within a cavity the second piece.

Item 30. The optical coupling device of any of items 25 through 29, wherein the second piece includes clips configured to hold the first piece.

Item 31. The optical coupling device of any of items 25 through 30, wherein the first mating alignment features provide fine mating alignment and the second mating alignment features provide coarse mating alignment.

Item 32. The optical coupling device of any of items 25 through 31, wherein the first mating alignment features comprise pins or sockets configured to engage with a socket or pin of a mating optical coupling device.

Item 33. The optical coupling device of any of items 25 through 32, wherein the second mating alignment features comprise arms that extend from the second piece.

Item 34. The optical coupling device of items 25 through 33, wherein at least one of the first and second receiving elements comprise grooves.

Item 35. The optical coupling device of items 25 through 34, wherein at least one of first and second receiving elements comprise ridges.

Item 36. The optical coupling device of any of items 25 through 35, wherein the optical waveguides are optical fibers.

Item 37. The optical coupling device of any of items 25 through 36, wherein the optical waveguides are an array of one or more integrated optical waveguides fabricated in a substrate.

Item 38. The optical coupling device of any of items 25 through 36, wherein the optical waveguides are arranged in a waveguide array film.

Item 39. The optical coupling device of item 38, wherein the waveguide array film includes features configured to engage with at least one of the receiving elements of the first piece and the second piece.

Item 40. The optical coupling device of item 39, wherein the features of the optical waveguide film comprise at least one of ridges, grooves, and vias.

Item 41. The optical coupling device of any of items 25 through 40, wherein the first piece and the second piece are pieces of an optical ferrule.

Item 42. The optical coupling device of any of items 25 through 40, wherein the first piece is an optical ferrule and the second piece is a housing of an optical connector.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical coupling device comprising a first piece comprising one or more first receiving elements and one or more first mating alignment features, and a second piece configured to be removably assembled to the first piece and comprising one or more second receiving elements and one or more second mating alignment features, the one or more first and second receiving elements configured to align the first and second pieces relative to each other by receiving and securing one or more optical waveguides therebetween, such that when the first and second pieces are assembled to each other and the optical coupling device mates with a mating optical coupling device, the one or more first mating alignment features of the first piece engage with the mating optical coupling device first and the one or more second mating alignment features of the second piece engage with the mating optical coupling device second.

2. The optical coupling device of claim 1, wherein the first piece is a first unitary molded piece and the second piece is a second unitary molded piece.

3. The optical coupling device of claim 1, wherein the one or more first mating alignment features provide coarse mating alignment and the one or more second mating alignment features provide fine mating alignment.

4. The optical coupling device of claim 1, wherein the one or more first mating alignment features comprise arms that extend from the first piece.

5. The optical coupling device of claim 1, wherein at least one of the one or more first and second receiving elements comprise grooves.

6. The optical coupling device of claim 1, wherein the one or more optical waveguides comprises one or more integrated optical waveguides fabricated in a substrate.

7. The optical coupling device of claim 1, wherein the first piece and the second piece are pieces of an optical ferrule.

8. The optical coupling device of claim 1, wherein the first piece is an optical ferrule and the second piece is a housing of an optical connector.

9. The optical coupling device of claim 1, wherein the one or more first mating alignment features comprises a pair of first mating alignment features and the one or more second mating alignment features comprises a pair of second mating alignment features, and wherein when the first and second pieces are assembled to each other, the pair of second mating alignment features are disposed between the pair of first mating alignment features.

10. The optical coupling device of claim 1, wherein the one or more optical waveguides comprises one or more optical fibers.

\* \* \* \* \*